United States Patent
Chang

(10) Patent No.: US 12,373,489 B1
(45) Date of Patent: Jul. 29, 2025

(54) AI-POWERED VIDEO CONTENT SEARCH

(71) Applicant: Google LLC, Mountain View, CA (US)

(72) Inventor: WeiChung Chang, Burlingame, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/428,598

(22) Filed: Jan. 31, 2024

(51) Int. Cl.
  *G06F 16/735*    (2019.01)
  *G06F 16/738*    (2019.01)
  *G06F 16/78*     (2019.01)

(52) U.S. Cl.
  CPC .......... *G06F 16/735* (2019.01); *G06F 16/738* (2019.01); *G06F 16/7867* (2019.01)

(58) Field of Classification Search
  CPC ... G06F 16/735; G06F 16/738; G06F 16/7867
  See application file for complete search history.

(56) References Cited

U.S. PATENT DOCUMENTS

| 11,734,348 B2 * | 8/2023 | Trim | G06V 20/41 707/723 |
| 2024/0169732 A1 * | 5/2024 | Dvornik | G09B 5/065 |

* cited by examiner

*Primary Examiner* — Baoquoc N To
(74) *Attorney, Agent, or Firm* — Lowenstein Sandler LLP

(57) ABSTRACT

A method for performing a video content search is provided. The method includes receiving a search query associated with one or more videos and obtaining subtitle files associated with the one or more videos. The subtitle files each include a corresponding transcript having a plurality of transcript passages and video timestamps for the plurality of transcript passages. The method further includes determining query responses based on contents of video segments of the one or more videos. The video segments correspond to passage time ranges relating to the search query. The passage time ranges each include video timestamps associated with a transcript passage in the subtitle files that correlates with the search query. The method further includes causing a query result to be presented to a user on a graphical user interface, the query result being based on the determined query responses.

17 Claims, 6 Drawing Sheets

AI-POWERED VIDEO CONTENT SEARCH

TECHNICAL FIELD

The instant specification generally relates to video navigation, and more specifically to supporting video content search using artificial intelligence (AI) models.

BACKGROUND

Video navigation refers to the process of moving through a video's timeline to reach a specific point or segment. It involves various tools designed to help users efficiently traverse a video to reach a specific point, which may range from a specific moment of the video to a broad section.

The need to navigate a video may arise in several scenarios when users are searching for particular content within a video. For instance, users may want to skip irrelevant parts of the video, replay sections for better comprehension, or pinpoint a favorite scene. Such a desire to fast-forward is compounded for long videos that contain many scenes or moments that may be less relevant to a user. For example, a student reviewing an online lecture might only need to revisit a specific portion of the video, which provides a complex explanation, or a film enthusiast might want to rewatch a captivating scene from a 2-hour (or longer) movie. Video navigation also plays a crucial role in professional settings, such as surveillance, where analysts may need to scrutinize specific moments from considerable amounts of raw video data. Thus, the ability to quickly navigate through considerable amounts of video content becomes applicable in many common situations for many users.

Traditionally, video search or navigation has been primarily implemented by a progress bar or scrubber, which allows a user to traverse the full duration of the video according to timestamps, or progression of the progress bar marker, or cursor. The progress bar (typically displayed underneath a video) allows users to visually gauge their position in the video and move to different parts by clicking or dragging the progress bar marker along the bar. Users can click or drag the cursor along this bar to move forward or backward through the video timeline. Users can also click anywhere on this bar to jump to that specific point in the video. Such a progress bar is interactive, and the marker may move in real-time as the video plays. In addition, fast-forward and rewind buttons are common features that allow users to skip through the video at a set rate.

Timestamps, often used in the context of a progress bar, are specific points in time that are usually denoted in a "hours:minutes:seconds" format (e.g., 00:15:30 for 15 minutes and 30 seconds into the video) that the progress bar marker can be moved to. Viewers can click on these timestamps to jump directly to those parts of the video. In such a way, a user can smoothly traverse through the content of a video.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

According to one aspect of the present disclosure a method for performing a video content search is provided. In some aspects, the method includes receiving, from a client device, a search query associated with one or more videos, obtaining one or more subtitle files associated with the one or more videos, where the one or more subtitle files each include a corresponding transcript having a plurality of transcript passages and video timestamps for the plurality of transcript passages, determining, using one or more artificial intelligence (AI) models, one or more query responses based on contents of one or more video segments of the one or more videos, the one or more video segments corresponding to one or more passage time ranges relating to the search query, the one or more passage time ranges each including at least one video timestamp associated with a transcript passage in the one or more subtitle files that correlates with the search query, and causing a query result to be presented to a user on a graphical user interface, the query result being based on the one or more determined query responses.

In some aspects, the one or more videos represent one video.

In some aspects, the one or more videos represent more than one video.

In some aspects, determining, using the one or more AI models, the one or more query responses based on the contents of the one or more video segments of the one or more videos includes providing the search query and one or more transcripts of the one or more videos as input to the one or more AI models, obtaining, as output of the one or more AI models, one or more transcript passages each including at least a portion that most closely correlates with the search query, and processing, using the one or more AI models, the one or more transcript passages and the one or more subtitle files to generate the one or more query responses and one or more passage time ranges associated with the one or more query responses.

In some aspects, obtaining the one or more subtitle files includes at least one of processing an audio file associated with the one or more videos using a set of speech-to-text conversion operations to generate the one or more subtitle files, or fetching an existing one or more subtitle files from a data location.

In some aspects, the one or more subtitle files include a subtitle file that has been generated based on input of at least one of a user or a community of users, or has been machine generated.

In some aspects, at least one subtitle file of the one or more subtitle files is in a SubRip Text (SRT) format.

In some aspects, the search query includes at least one of a scene description of a scene within the one or more videos, a scene quality of a scene within the one or more videos, a time associated with a timestamp within the one or more videos, or a question pertaining to the contents of the one or more videos.

In some aspects, the one or more query responses include at least one of a response defining a video segment of the one or more videos that corresponds to the scene description from the text of the search query, a response defining a video segment of the one or more videos that includes the scene quality from the text of the search query, a response defining a video segment of the one or more videos that corresponds to the time in the text of the search query, or a response including a content description of a video segment of the one or more videos that answers the question pertaining to the contents of the one or more videos.

In some aspects, the one or more AI models include at least one large language model (LLM).

According to one aspect of the present disclosure a system for performing a video content search is provided. In some aspects, the system includes a memory device, and a processing device communicatively coupled to the memory device. In some aspects, the processing device is to receive, from a client device, a search query associated with one or more videos, obtain one or more subtitle files associated with the one or more videos, wherein the one or more subtitle files each include a corresponding transcript having a plurality of transcript passages and video timestamps for the plurality of transcript passages, determine, using one or more artificial intelligence (AI) models, one or more query responses based on contents of one or more video segments of the one or more videos, the one or more video segments corresponding to one or more passage time ranges relating to the search query, the one or more passage time ranges each including at least one video timestamp associated with a transcript passage in the one or more subtitle files that correlates with the search query, and cause a query result to be presented to a user on a graphical user interface, the query result being based on the one or more determined query responses.

In some aspects, the one or more videos represent one video.

In some aspects, the one or more videos represent more than one video.

In some aspects, determining, using the one or more AI models, the one or more query responses based on the contents of the one or more video segments of the one or more videos includes providing the search query and one or more transcripts of the one or more videos as input to the one or more AI models, obtaining, as output of the one or more AI models, one or more transcript passages each including at least a portion that most closely correlates with the search query, and processing, using the one or more AI models, the one or more transcript passages and the one or more subtitle files to generate the one or more query responses and one or more passage time ranges associated with the one or more query responses.

In some aspects, obtaining the one or more subtitle files include at least one of processing an audio file associated with the one or more videos using a set of speech-to-text conversion operations to generate the one or more subtitle files, or fetching an existing one or more subtitle files from a data location.

In some aspects, the one or more subtitle files include a subtitle file that has been generated based on input of at least one of a user or a community of users, or has been machine generated.

According to one aspect of the present disclosure, a non-transitory computer readable storage medium is provided. In some aspects, the non-transitory computer readable storage medium includes instructions that, when executed by a processing device, causes the processing device to perform operations including receiving, from a client device, a search query associated with one or more videos, obtaining one or more subtitle files associated with the one or more videos, where the one or more subtitle files each include a corresponding transcript having a plurality of transcript passages and video timestamps for the plurality of transcript passages, determining, using one or more artificial intelligence (AI) models, one or more query responses based on contents of one or more video segments of the one or more videos, the one or more video segments corresponding to one or more passage time ranges relating to the search query, the one or more passage time ranges each including at least one video timestamp associated with a transcript passage in the one or more subtitle files that correlates with the search query, and causing a query result to be presented to a user on a graphical user interface, the query result being based on the one or more determined query responses.

In some aspects, the one or more videos represent one video.

In some aspects, the one or more videos represent more than one video.

In some aspects, determining, using the one or more AI models, the one or more query responses based on the contents of the one or more video segments of the one or more videos includes providing the search query and one or more transcripts of the one or more videos as input to the one or more AI models, obtaining, as output of the one or more AI models, one or more transcript passages each including at least a portion that most closely correlates with the search query, and processing, using the one or more AI models, the one or more transcript passages and the one or more subtitle files to generate the one or more query responses and one or more passage time ranges associated with the one or more query responses.

BRIEF DESCRIPTION OF THE DRAWINGS

Aspects and embodiments of the present disclosure will be understood more fully from the detailed description given below and from the accompanying drawings of various aspects and embodiments of the disclosure, which, however, should not be taken to limit the disclosure to the specific aspects or embodiments, but are for explanation and understanding only.

DETAILED DESCRIPTION

Figure 1:
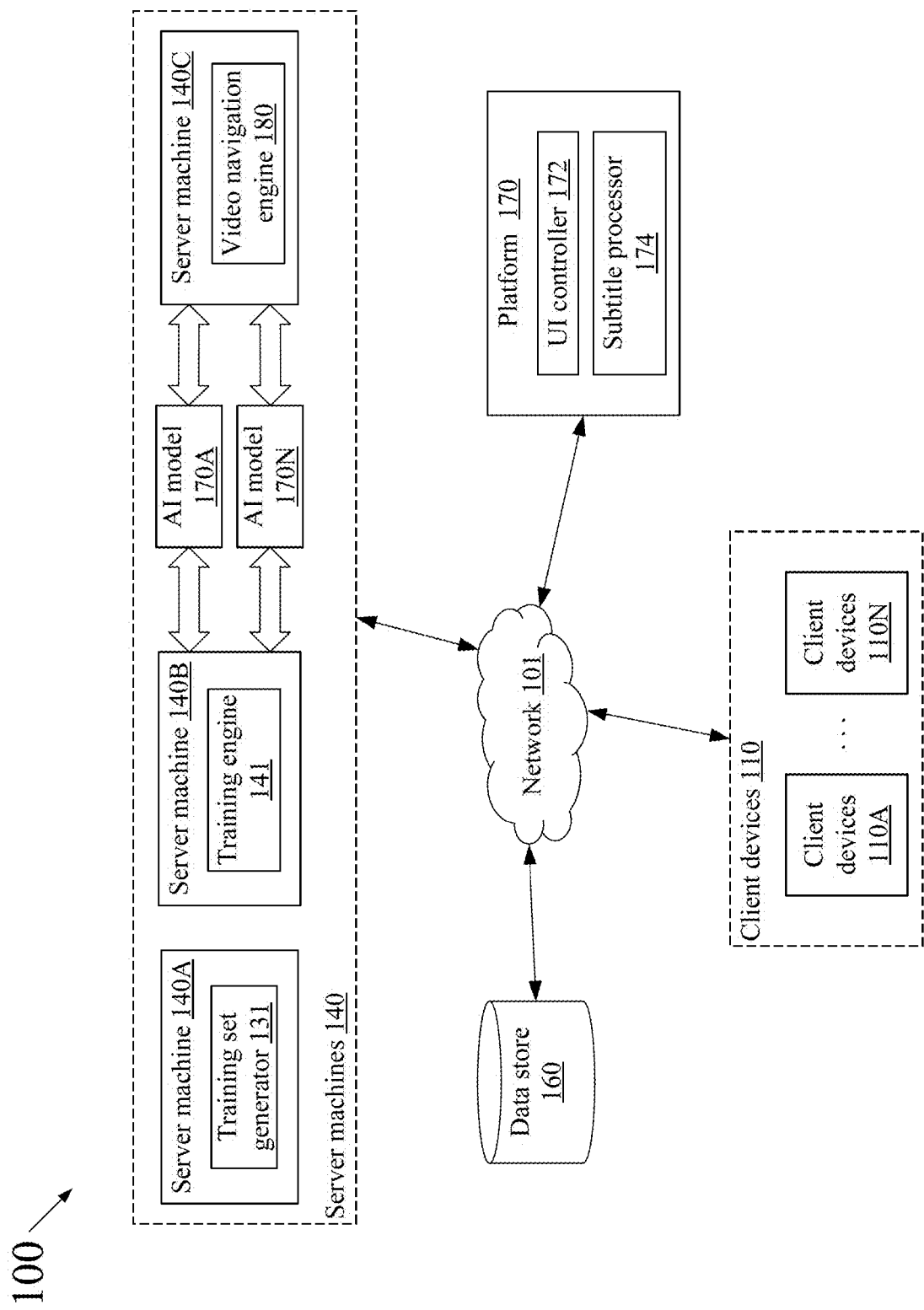
FIG. 1 illustrates an example system architecture to support content-based video searches, in accordance with one embodiment of the present disclosure.

Current methods for video search or navigation include some challenges that make the process of finding a specific moment within a video more difficult and time-consuming. One common difficulty associated with manually scrubbing through the progress bar, is that such a method can be an imprecise way of navigating through a video, particularly for longer videos where fine control is harder to achieve. The progress bar may not be large enough, particularly for longer videos, to offer the level of granularity needed to pinpoint specific moments or scenes. This may be exacerbated in the case where users are viewing a video on a smaller screen, or where users are using their finger to control the bar (e.g., as on a phone).

Furthermore, arriving at a specific scene within a video is often more complex than simply clicking on a point in the progress bar. Unless a user previously knows the exact timestamp associated with the scene they are looking for, a user needs to traverse the entire video chronologically, often watching segments that are not relevant to their search. This process can be tedious and time-consuming, particularly if the video lacks markers or chapters to help guide the navigation. Even with the help of previews or thumbnails, which may provide a visual representation of different parts of the video, finding the exact scene without knowledge of its timestamp can be like looking for a needle in a haystack. A progress bar may further lack frame-by-frame control, or the visual cues needed to identify a particular segment of interest, which can lead to a frustrating experience for the user who may miss the target scene, or video segment, and must repeatedly scrub back and forth to find the desired moment. Such inefficiencies in the navigation process highlights the need for more versatile and user-friendly video navigation tools, that can help users quickly locate and access the content they are seeking.

Aspects and implementations of the present disclosure address these and other challenges of modern video navigation by providing systems and methods for intelligently navigating a video based on a user's search query (e.g., natural language query) pertaining to the content within the video that the user is searching. According to embodiments of the present disclosure, a video navigation tool can intake a search query from a user, determine a video segment that is the most relevant to the search query, and navigate to and playback the determined video segment.

The most relevant segment can be determined using subtitles associated with a video. In some embodiments, the subtitles may be pre-existing, either through previously employed machine transcription methods or provided by a user or a user community. In other embodiments, there may be no subtitle file, and the system may generate the subtitles upon receiving a user search query. In some embodiments, the video and audio data can be requested, and a speech-to-text functionality of a subtitle processor can generate the subtitles. In some embodiments, the subtitles can be stored in a particular format, e.g., SubRip Text (SRT) format. In an SRT formatted file, each subtitle entry in the SRT file can consist of three parts: a numeric index, a timestamp, and the actual subtitle text. These parts can be separated by line breaks, and each subtitle entry can be separated from the next (e.g., by a blank line).

In some embodiments, the formatted subtitle file can be used to create a table mapping subtitle text to time, or vise-versa. Alternatively, the formatted subtitle file may be directly leveraged to map subtitle text to time, or vise-versa. In some embodiments, after the formatted subtitle file has been generated and/or the mapping table formed, filtering functionality can be used to filter the dialogue, or plain text content from the formatted subtitle file, to create a plain text content file, consisting of only the text, sans indices or timestamps.

In some embodiments, a graphical user interface (GUI) can be provided to allow a user to enter a search query associated with one or more videos from a user. Specifically, the GUI may allow a user to search for a particular section of a video, based on a textual query, sentiment, or any other descriptive factors. For example, the GUI may present a video selected by a user and allow the user to input text into an input field (e.g., a chat box), such as, "How many credit cards should one have?"

In some embodiments, the system may then use the user query, together with a formatted subtitle file and/or a plain text content file associated with the video, and a directive to generate a response to the user query as input for one or more AI models (including, for example, a large language model (LLM)) to generate a response to the user query.

In some embodiments, the system employs a two-phase process to generate a response to a user search query associated with a video. Specifically, the first phase may include inputting, into an AI model, text of the user query, the plain text content file associated with the video, and a directive to identify one or more transcript passages that closely correlate with the user query, and obtaining an output of the AI model that includes a search result specifying one or more transcript passages that closely correlate with the user query The second phase may be performed to refine the above search result to identify the most relevant segment of the formatted subtitle file that provides a specific answer to the user's search query. In particular, the second phase may include inputting, into the same or different AI model, the above search result, and the formatted subtitle file, together with a directive to identify a key segment (e.g., key phrase). The output of the AI model may specify a key segment from the transcript passage(s) included in the above search result. In some embodiments, the output of the AI model may also specify the time frame, and/or range, which corresponds to the key segment. The GUI may then navigate to the key segment in the video and optionally initiate playback of the key segment.

In some embodiments, a user may be allowed to search over multiple videos, or a whole database of videos. Multiple formatted subtitle files (e.g., SRT formatted subtitle files) and plain text files can be created and used to respond to a user query. In such a case, instead of outputting one time range of one video associated with the user query, multiple videos, and corresponding time ranges can be identified for a user input or query.

Advantages of aspects of the present disclosure that support AI-powered video content searches include, but are not limited to, reducing the time needed to identify video content searched for by users and achieving more accurate search results, thus making video content searches to be easily performed for a large number of users, as well as resulting in reduced consumption of computing and storage resources. The time and accuracy can be especially improved for videos lack markers or chapters, and for longer videos where the use of a traditional progress bar may not produce the level of granularity needed to pinpoint specific moments or scenes. Additionally, aspects of the present disclosure allow a user to search for video content using a natural language query, which simplifies the search process and may be particularly convenient when searching on small screen devices where the progress bar may not be large enough to be effectively controlled by the user's finger.

FIG. 1 illustrates an example system architecture to support content-based video searches, in accordance with one embodiment of the present disclosure. The system architecture 100 (also referred to as "system" herein) may include client devices 110 or 110A-N, a data store 160, a video streaming platform 170, and/or server machines 140A-C, each connected to a network 101.

In some embodiments, video streaming platform 170, server machines 140A-C, client device 110, and data store 160 can include, can be, or can otherwise be connected to one or more computing devices, (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components capable of connecting to system 100. In some embodiments, network 101 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 160 can be a persistent storage capable of storing data as well as data structures to tag, organize, and index the platform data. In some implementations, a data item of platform data can correspond to one or more portions of a content item for display to a content viewer via a graphical user interface (GUI) on a viewing user device 110, in accordance with implementations described herein. A data item can correspond to metadata for a content item, such as a content item title, transcript, description, length, or content item viewing statistics. In some implementations, a data item of platform data can correspond to one or more portions of a channel, including channel metadata such as a channel title, channel description, channel uploading user, or channel viewing statistics. Data store 160 can be hosted by one or more storage devices, such as main memory, magnetic or optical storage-based disks, tapes or hard drives, NAS, SAN, and so forth. In some implementations, data store 160 can be a network-attached file server, while in other implementations the data store 160 can be some other type of persistent storage such as an object-oriented database, a relational database, and so forth, that may be hosted by platform 160 or one or more different machines coupled to the platform 160 via network 101.

The user devices 110A-N can each include computing devices such as personal computers (PCs), laptops, mobile phones, smart phones, tablet computers, netbook computers, network-connected televisions, etc. Each user device 110 can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital content items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital content items (e.g., digital video items, digital images, electronic books, etc.). According to aspects of the disclosure, the content viewer can be a content platform application for users to record, edit, and/or upload content for sharing on platform 170. As such, the content viewers and/or the UI associated with the content viewer can be provided to user devices 110A-N by platform 170. In one example, the content viewers can be embedded media players that are embedded in web pages provided by the platform 170.

Platform 170 can include one or more channels. A channel can include metadata about the channel, and one or more content items available from a common source, or content items having a common topic, theme, or substance. The metadata can include information about the channel, such as a title, description, date, user uploader, usage statistics, or content language. In some implementations, the metadata can include information about the content items of the channel, such as a respective content item's title, description, date, identity of channel owner, usage statistics, or language.

A channel can represent one or more content items (e.g., digital content) chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

A content item can be consumed via the Internet or via a mobile device application, such as a content viewer of viewing client devices 110A-N. In some implementations, a content item can correspond to a media file (e.g., a video file, an audio file, a video stream, an audio stream, etc.). In other or similar implementations, a content item can correspond to a portion of a media file (e.g., a portion or a chunk of a video file, an audio file, etc.). As discussed previously, a content item can be requested for presentation to the user by the user of the platform 170. As used herein, "content item" can include an electronic file that can be executed or loaded using software, firmware or hardware configured to digitally present the content item to an entity. As indicated above, in at least one implementation, the platform 170 can store the content items (in one or more formats), or references to the content items, using the data store 160.

In some implementations, a content item can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some implementations, a video item can be stored (e.g., at data store 160) as a video file that includes a video component and an audio component. The video component can include video data that corresponds to one or more sequential video frames of the video item. The audio component can include audio data that corresponds to the video data.

In some implementations, platform 170 and/or server machines 140 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide users with access to channels and/or content items, and allow users to perform video content searches. For example, platform 170 can include a user-facing webpage. Platform 170 can also include back-end software that can be used to provide users with access to channels and/or content items, and allow users to perform video content searches.

In some embodiments, a video streaming platform, (e.g., platform 170) can use a video navigation engine 180 to allow users to quickly and intuitively navigate a video. Video navigation engine 180 can be hosted by server machine 140C, which may be part of platform 170 or another platform or system. Platform 170 may also use can a user-interface (UI) controller 172 to provide UIs for presentation on client devices 110A-N (e.g., using a content viewer).

The UIs may present and/or play content items, and receive user input pertaining to the content items. In an example, in the case of video navigation (e.g., via a progress bar in a UI of a media player or media viewer), UI controller 172 may receive the fast forward, pause, or any other navigation command (such as a text-based command, as will be further described below), and work with the video navigation engine 180 and/or other components of the system to effect the user navigation request.

In some embodiments, a user of client device 110 can input textual data (e.g., a user query) into an input field of the UI, which may be a chat box, to provide a search query related to one or more videos of the platform 170. The video(s) may be associated with subtitles. In some embodiments, platform 170 uses a subtitle processor 174 to generate and manage subtitles for the videos or manage subtitles provided by users. In some embodiments, subtitle processor 174 creates and/or stores the subtitles in a particular format (e.g., SRT format) that allows mapping of subtitle text to time (e.g., timestamp), or vise-versa. UI controller 172 and/or subtitle processor 174 may be part of the platform 170 or a different platform or system, and may reside on the same server machine (e.g., machine 140C) as video navigation engine 180 or on one or more other machines.

In some embodiments, in response to a search query of a user, video navigation engine 180 obtains the subtitle file(s) associated with the respective video(s) and determines a response to the search query using the obtained subtitle file(s). Specifically, video navigation engine 180 can provide information about the user's search query (e.g., the query content, or abstractions of a received query) and the subtitle file(s) as input to the AI models 170A-N to obtain one or more outputs that indicate a query response. Video navigation engine 180 can use a single AI model or multiple AI models to determine the query response.

The AI models 170A-N can include one or more of decision trees, random forests, support vector machines, or other types of machine learning models. In one embodiment, such AI models may include one or more artificial neural networks (also referred to simply as a neural network). The artificial neural network can include a feature representation component with a classifier or regression layers that map features to a target output space. The artificial neural network may be, for example, a convolutional neural network (CNN) that can include a feature representation component with a classifier or regression layers that map features to a target output space, and can host multiple layers of convolutional filters. Pooling can be performed, and non-linearities may be addressed, at lower layers, on top of which a multi-layer perceptron can be commonly appended, mapping top layer features extracted by the convolutional layers to decisions (e.g., classification outputs). The neural network may further be a deep network with multiple hidden layers or a shallow network with zero or a few (e.g., 1-2) hidden layers. Deep learning may use a cascade of multiple layers of nonlinear processing units for feature extraction and transformation. Each successive layer can use the output from the previous layer as input. In deep learning, each level learns to transform its input data into a slightly more abstract and composite representation.

In some embodiments, the AI models 170A-N may include one or more recurrent neural networks (RNNs). An RNN is a type of neural network that includes a memory to enable the neural network to capture temporal dependencies. An RNN is able to learn input-output mappings that depend on both a current input and past inputs. The RNN can address past and future measurements and make predictions based on this continuous measurement information. One type of RNN that may be used is a long short term memory (LSTM) neural network.

The AI models 170A-N can include at least one generative AI model, such as a large language model (LLM) allowing for the generation of new and original content. A generative AI model may include aspects of a transformer architecture, or a GAN architecture. Such a generative AI model can use other machine learning models including an encoder-decoder architecture including one or more self-attention mechanisms, and one or more feed-forward mechanisms. In some embodiments, the generative AI model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including recurrent neural networks (RNNs), convolutional neural networks (CNNs), or transformer networks. A generative AI model can be pre-trained on a large corpus of data so as to process, analyze, and generate human-like text based on given input. Any of the AI models may have any typical architecture for LLMs, including one or more architectures as seen in Bidirectional Encoder Representations from Transformers (BERT), Generative Pre-trained Transformer series (Chat GPT series LLMs), or leverage a combination of transformer architecture with pre-trained data to create coherent and contextually relevant text.

According to aspects of the present disclosure, the AI models 170A-N together with the video navigation engine (and optionally UI controller 172 and/or subtitle processor 174) may be hosted on the cloud (e.g., using cloud resources associated with platform 170), at data center associated with platform 170, or on client devices 110A-V. In some embodiments, any of the AI models 170A-N may be a self-hosted AI model, or in other embodiments, may be an external AI model only accessed by an API.

AI models 170A-N can be trained using training data. In embodiments, server machine 140A can include a training set generator 131 that is capable of generating training data (e.g., a set of training inputs and a set of target outputs) to train the AI models 170A-N. Training data can be associated with training an AI model 170A to generate a response to a user query based on any combination of metadata, question language, the subtitle text corresponding to a video, and/or external information (not shown in FIG. 1). In embodiments, the user query may be formed in natural language.

Training set generator 131 can accept responses as training input data to generate a training corpus for the AI model 170A-N. Training set generator 131 (or another component of system 100) can store the generated corpus of training data at data store 160. In some implementations, training set generator 131 can generate training data that can be used to refine an already trained model (e.g., AI model 170A). In some implementations, training set generator 131 can generate training data that can be used to train an LLM. In some implementations, training input data can be populated with historical variations of data. In some implementations, training set generator 131 can attach various training labels to training input data used to generate training data.

In some implementations, model training can be supervised, and each set of training data can include a subset of training inputs and target outputs based on the identified data. To train a supervised model, training set generator 131 can generate training data including a subset of training inputs and a subset of target outputs. The subset of training inputs can include questions, and a subset of target outputs can include responses (which in some cases may be textual responses). In some implementations, a subset of training inputs can include responses and a subset of target outputs can include a question. In some implementations, training set generator 131 can include an LLM that accepts responses and generates similar descriptions based on the input of the responses for a particular question. In some implementations, model training can be unsupervised. To train an unsupervised model, training set generator 131 can generate training data by clustering groups of historical responses (e.g., included in data store 160) based on similarities between the historical responses, through dimensionality reduction by reducing the number of features in the data while retaining as much relevant information about the historical responses as possible, by generating synthetic or partially synthetic data that resembles the original data, through anomaly detection by identifying parts of content items that are significantly different from the rest of the data, or through data augmentation by applying mathematical transformations to the training dataset.

Server machine 140B may include a training engine 141. Training engine 141 can train an AI model (e.g., AI models 170A-N) using the training data from training set generator 131. In some implementations, the AI model 170A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), identify clusters of data that correspond to the identified patterns, and provide the AI model 170A-N that captures these patterns. For example, the AI model 170A-N can be trained by adjusting weights of a neural network in accordance with a back-propagation learning algorithm or the like. The AI model 170A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some implementations, training engine 141 can train the AI models 170A-N using a generative adversarial network (GAN). A GAN can consist of two neural networks, where one neural network is a generative AI model, and the other neural network is a discriminative AI model. GAN can cause each of the two neural networks to engage in a competitive process against the other neural network. The generative AI model can attempt to synthesize data that is indistinguishable from collected data (e.g., input data to the generative AI model), and the discriminative AI model can attempt to differentiate between collected data and synthesized data. GAN training can iteratively refine the output of the generative AI model to align to the collected dataset more closely. In some implementations, training engine 141 can train the AI models 170A-N using a variational auto-encoder (VAE), which can introduce probabilistic encoding to represent input data. The probabilistic encoding can be processed through one or more layers and then decoded to reconstruct a generative output. In this way, VAE can be used to train the AI models 170A-N to learn latent configurable representations of data (e.g., the probabilistic encoding through various layers). Output from the AI models 170A-N trained using VAE can be continuously reconfigured based on the latent configurable representations of data.

It should be noted that in some implementations, the functions of server machines 140A-C or platform 170 may be provided by a fewer number of machines. For example, in some implementations the server machines 140A-C may be integrated into a single machine, while in other implementations the server machines 140A-C may be integrated into multiple machines. In addition, in some implementations one or more of server machines 140A-C can be integrated into 170. In some implementations, one or more of server machines 140A-C can be integrated separately from platform 170.

In general, functions described in implementations as being performed by platform 170 and/or server machines 140A-C can also be performed on the client devices 110 in other implementations, if appropriate. In addition, the functionality attributed to a specific component can be performed by different or multiple components operating together. Platform 170 can also be accessed as a service provided to other systems or devices through appropriate application programming interfaces, and thus is not limited to use in websites.

It is appreciated that in some implementations, platforms 170, machines 140A-C, and/or data store 160, or client devices of the system (e.g. client devices 110), may each include an associated API, or mechanism for communicating with APIs. In such a way, any of the components of system 100 may support instructions and/or communication mechanisms that may be used to communicate data requests and formats of data to and from any other component of system 100, in addition to communicating with APIs external to the system (e.g., not shown in FIG. 1).

In some embodiments of the disclosure, a "user" may be represented as a single individual. However, other implementations of the disclosure encompass a "user" being an entity controlled by a set of users and/or an automated source.

In situations in which the systems, or components therein, discussed here collect personal information about users, or may make use of personal information, the users may be provided with an opportunity to control whether the system or components collect user information (e.g., information about a user's social network, social actions or activities, profession, a user's preferences, or a user's current location), or to control whether and/or how to receive content from the system or components that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the system and components.

Figure 2:
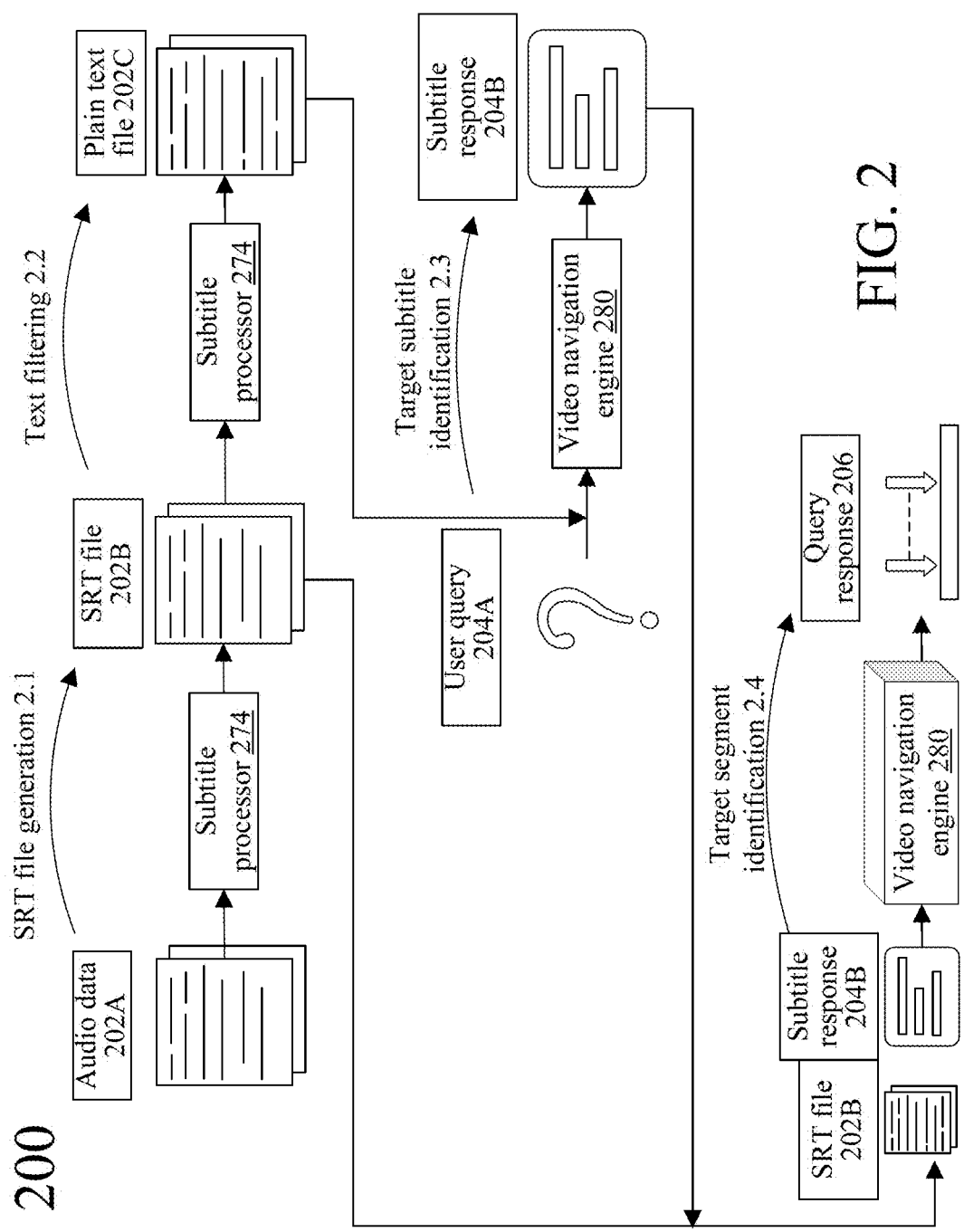
FIG. 2 illustrates an example process for supporting content-based video searches utilizing artificial intelligence (AI) models, in accordance with one embodiment of the present disclosure.

FIG. 2 illustrates an example process for supporting content-based video searches utilizing one or more AI models, in accordance with one embodiment of the present disclosure. In some embodiments, the process 200 of FIG. 2 may leverage a subtitle processor 274 for speech-to-text functionality and filtering functionality. In embodiments, the video navigation engine 280 may leverage an internal (or external) AI model, or pre-trained large language model. In some embodiments, speech-to-text functionality and filtering functionality of subtitle processor 274 may be analogous, or similar, to functionality of subtitle processor 174 as was described with respect to FIG. 1 and incorporate at least the embodiments described therein. In some embodiments, video navigation module 280 may be analogous, or similar, to video navigation engine 180 as was described with respect to FIG. 1 and incorporate at least the embodiments described therein. In embodiments, subtitle processor 274 and video navigation engine 280 may use one or more AI models (not shown in FIG. 2) to perform functions or processes.

As illustrated by FIG. 2, in some embodiments, the process 200 can begin at operation 2.1, SRT file generation. In some embodiments, operation 2.1 can intake video or audio data (e.g. audio data 202A), and output an SRT file 202B including SRT formatted subtitle data corresponding to the audio.

An SRT file (e.g., file 202B) may contain multiple subtitle entries extracted from the audio and/or video data. Each subtitle entry in the SRT file may consist of three parts: a numeric index used to indicate the order with respect to the entries, a timestamp indicative of an associated time of an associated video, and the actual subtitle text or short passage of subtitle text. These parts may be separated by line breaks, and each subtitle entry (i.e., passage of the audio transcript) may be separated from the next by a blank line. In some embodiments, to generate such a file, the subtitle processor 274 may employ elements of manual transcription, automated transcription, or use a hybrid approach.

For example, in some embodiments, manual transcription may be applied. In such cases, a human operator may listen to audio data 202A and transcribe the spoken content into text form. The transcriber further may timestamp the beginning and end of each phrase or sentence, aligning the text with the appropriate moment in the video or audio data, and thus following after an SRT format.

In other embodiments, automated transcription may be employed. In such cases, speech recognition technology may be used to automatically convert spoken words from audio data 202A into text. Such technology can further generate timestamps for when each word or phrase that was spoken. In some embodiments, such technologies may leverage advanced machine learning techniques, such as deep learning algorithms. These algorithms may be trained on large amounts of annotated audio data. After the transcription process, further algorithms can be used to divide the transcript into smaller segments and assign timestamps to each segment, thus manipulating the data into an SRT formatted file.

In some embodiments, a hybrid approaches may be used, in which combined automated transcription and manual review may be performed. In such a scenario, an automated system may first generate a draft transcript, which may after be reviewed and corrected by a human operator before the file is finalized.

In alternate embodiments, the subtitles may be pre-generated, either via a community generated subtitle file, or via prior processing. In such cases, operation 2.1 may simply fetch the SRT formatted subtitle data from an appropriate location.

At operation 2.2, plain text file 202C can be extracted from an SRT formatted subtitle file (e.g., SRT file 202B) using programming filtering techniques, which parse the file's structured format to isolate and retrieve the textual data from the transcript passages of an SRT file.

Since each subtitle entry in the SRT file consists of three parts (e.g., the numeric index, timestamp, and the actual subtitle text), a programming filter can be designed to process the SRT file line by line. When such a filter encounters a line containing a numeric index or a timestamp, it can ignore or discard this line, continuing to the next line. When the filter encounters a line with text (determined, for example, by checking if the line contains non-numeric characters), it can add this line to the output. This process can continue until the entire file has been processed and a plain text file including all transcript passages from the SRT file are combined.

Thus, in such a way, a programming filter technique as described can effectively extract the plain text content from an SRT subtitle file (e.g., SRT file 202B), discarding the numeric indices, timestamps, and any markup or formatting instructions. Thus, plain text file 202C can be a plain text stream of the combined passages of the video subtitles (or transcribed subtitles).

At operation 2.3, the video navigation engine 280 can provide a user query 204A, together with the plain text of plain text file 202C as input into an AI model to generate a subtitle response 204B. In some embodiments, the input to the AI model may also include a command to find transcript passage(s) that correlates the most to the user query 204A. In some embodiments, underlying AI model may be an AI model according to a LLM architecture that is trained on prior user queries and corresponding subtitle responses.

In some embodiments, a user query can include a range of search criterion, including time (e.g., "What is described between minute 3 and minute 5 of the video?"), content ("What is the recommended maximum number of credit cards to have?"), semantics ("Which segments of the video have low quality?"), and description ("Which scene of the video focuses on the recommended maximum number of credit cards to have?") as user query 204A. The video navigation engine 280 can then use an underlying AI model to find the most closely associated text within the plain text file 202C. In some embodiments, the underlying AI model (e.g., LLM) may parse and preprocesses the input to understand the context and intent of the user query. Simultaneously, the underlying AI model may parse and preprocesses the plain text of file 202C to transform the text into a comparable format to the user query. As such, similar NLP techniques and understanding of language patterns may be applied to extract and index meaningful information from the content. This process may involve determining the salience of various text elements, identifying key entities and concepts, and mapping out the semantic relationships between them.

Once the user query 204A and plain text 202C are both processed, the underlying AI model may identify the most relevant passage of subtitle text within plain text 202C, based on user query 204A. For example, upon understanding and interpreting the user query 204A and the plain text content 202C, the underlying AI model may align the query's contextual intent with the content's indexed information. The model may employ advanced matching algorithms and scoring metrics to identify the most relevant transcript passages from the plain text content 202C that satisfactorily address the user query 204A. In a specific example of the user query "What is the recommended maximum number of credit cards to have?", the identified passages can be:

According to the financial experts mentioned in the Wall Street Journal article, people should carry a maximum of three credit cards, and one of them should be a debit card.

Additionally, one of the credit cards should be from a different company than the other credit card(s) to provide more flexibility in case of merchant acceptance issues.

These passages may represent a subtitle response 204B. In some embodiments, the subtitle response 204B can be relayed back to the user, or otherwise output for further processing. Alternatively, the subtitle response 204B can be further refined to determine the key aspect (e.g., key phrase) of the identified passage(s). In such alternative embodiments, at operation 2.4, the subtitle response 204B, which includes the passage(s) found in text file 202C, may be input to the AI model (e.g., the same or different underlying AI model), together with the SRT file 202B to generate a query response 206. In some embodiments, the input to the AI model may also include a command to find a key phrase in the subtitle response 204B. In some embodiments, the underlying AI model may be an AI model according to a LLM architecture that is trained on text passages and corresponding key phrases of the text passages.

In some embodiments, the underlying AI model of the video navigation engine can be deployed to analyze SRT file 202B and subtitle response 204B, to provide an output including the key phrase and the appropriate timestamps, or timestamp range, associated with the key phrase, which can be used to generate the query response 206. Following the above example of the user query "What is the recommended maximum number of credit cards to have?", the query response 206 may include the key phrase, the timestamp range corresponding to the key phrase and the line number form the SRT file, as shown below:

34
00:01:06.840→00:01:09.299
carrying three credit cards maximum and

In embodiments, the query response 206 may be adjustable in length. For instance, the underling AI model may identify the "key," or concrete piece of information relevant to the user query, and to ensure that this information provides a complete and accurate response, the time range may be adjusted to include not only the closest answer but also any additional context that surrounds it. For example, the time range of the query response 206 may be configured (e.g., by a user or a system administrator) to cover an entire sentence that includes the key phrase or to include a predefined number of seconds before and/or after the key phrase.

As discussed above, one or more underlying AI models (in some cases two distinct AI models), through a combination of natural language processing, semantic understanding, and pattern matching, can identify a video segment that contains, or is most closely associated with a response to the user query 204A. The resulting query response 206 can then be relayed back to the user, the video streaming platform (e.g., platform 170 as seen in FIG. 1), or otherwise output for further processing. In one example, for a user search query including time (e.g., "What is described between minute 3 and minute 5 of the video?"), query response 206 may include a description (e.g., the key phrase) of a video segment that corresponds to the time in the text of the search query. In another example, for a user search query specifying content ("What is the recommended maximum number of credit cards to have?"), query response 206 may include the key phrase of a video segment that is the most relevant to the inquired content in the text of the search query. In yet another example, for a user search query specifying semantics ("Which segments of the video have low quality?"), query response 206 may identify a scene in the video that matches the semantics from the text of the search query. In yet another example, for a user search query specifying description ("Which scene of the video focuses on the recommended maximum number of credit cards to have?"), query response 206 may identify a scene in the video that matches the description in the text of the search query.

Figure 3A:
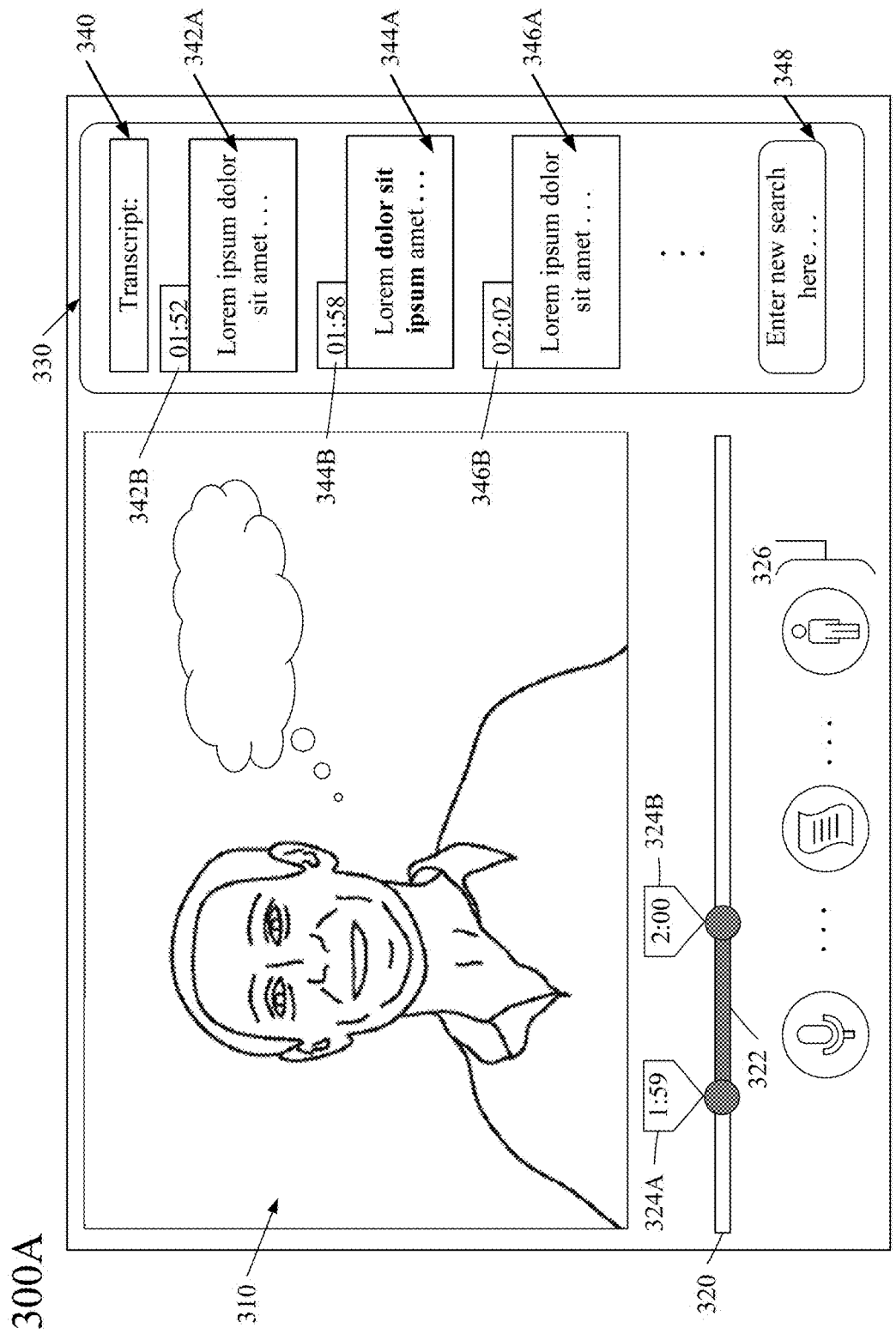
FIG. 3A illustrates an example user interface (UI) to facilitate content-based searches within a video, in accordance with some embodiments of the present disclosure.

FIG. 3A illustrates an example user interface (UI) 300A to facilitate content-based searches within a video, in accordance with some embodiments of the present disclosure. UI 300A may be provided to, and/or for presentation, at a client device (e.g., a client device 110A-N of FIG. 1). As described with respect to FIG. 1, UI controller 172 may generate the UI 300A to enable users to input and receive data, instructions, queries, or any other kind of communication to or from any platform or engine of the system.

In some embodiments, UI 300A can hold a main region (e.g., media player window) 310 to display and play a primary video for user viewing. Multiple subregions can hold other elements, such as the progress bar 320 below the main region 310, or the subregion 330 on the right side of the UI.

The UI may also present to the user interactive elements like buttons and sliders for controlling various aspects of the video. For instance, the progress bar, buttons for muting/unmuting audio or video, adjusting audio volume, switching video layouts, and other actions. In one example, as seen in UI 300A, a user may be shown a list of command buttons (e.g., button list 326) with which a list of commands (e.g., for muting, fast-forwarding, pausing, commenting, adjusting resolution, etc.) may be presented to the user.

As discussed above, the UI can include a subregion 330 that may include various visual elements for user interaction. In some embodiments, the subregion 330 can include a real-time transcript (e.g., as labeled by title box 340) that can automatically scroll as the video in main region 310 plays. For instance, as seen in text box 342A of transcript, the text within sub-region 330 can correspond, or be a subtitle of, the video at the corresponding time stamp (seen at indicator 342B). Beneath the text box 342A, the text box 344A may hold the subtitles and subsequent time stamp 344B. The sequence (including text box 346A and corresponding time stamp 346B) may be continued to scroll for further text boxes and time stamps for the duration of the video.

The UI 300A may also include an input field 348 that may be used by the user to input textual data to conduct a content search (as has been described with respect to FIGS. 1-2), in addition to the traditional progress bar.

As discussed above, the UI can include various playback and navigation controls, which the user can interact with. One example of such can be a progress bar 320. In embodiments, after a video content search has been conducted based on user query entered field 348, the responsive video segment may be skipped to and presented. In embodiments, the responsive video segment may be presented in the main region 310 (as video content), in the subregion 330 (as the corresponding highlighted portion of the transcript passage 344A) and in the progress bar 320 (as the indicated range 322 denoted by start marker 324A and end marker 324B). It is important to note that shapes, spatial configurations, and style of the UI 300A may appear in many configurations while maintaining similar functionality, and that UI 300A as seen is exemplary. For example, in some embodiments of the UI, field 348 may be placed above main region 310, or anywhere else within UI 300A, as may be feasible.

Thus, filed 348 may be included in UI 300A to allow a user to request a video content search based on specified search query. As discussed above, a user may search for a particular section of a video, based on a textual query, sentiment, or any other descriptive factors that might be input into such a video navigation engine and one or more LLM(s) or AI models.

In some embodiments, field 348 may allow use of a microphone and speech-to-text functionalities, or of a machine generated textual suggestion for a user to select, or any other kind of user input that might be used for video navigation. Thus, a user engaging with the UI 300A can perform a content search that may skip, or jump to, a desired location of the video, based on the user query.

Figure 3B:
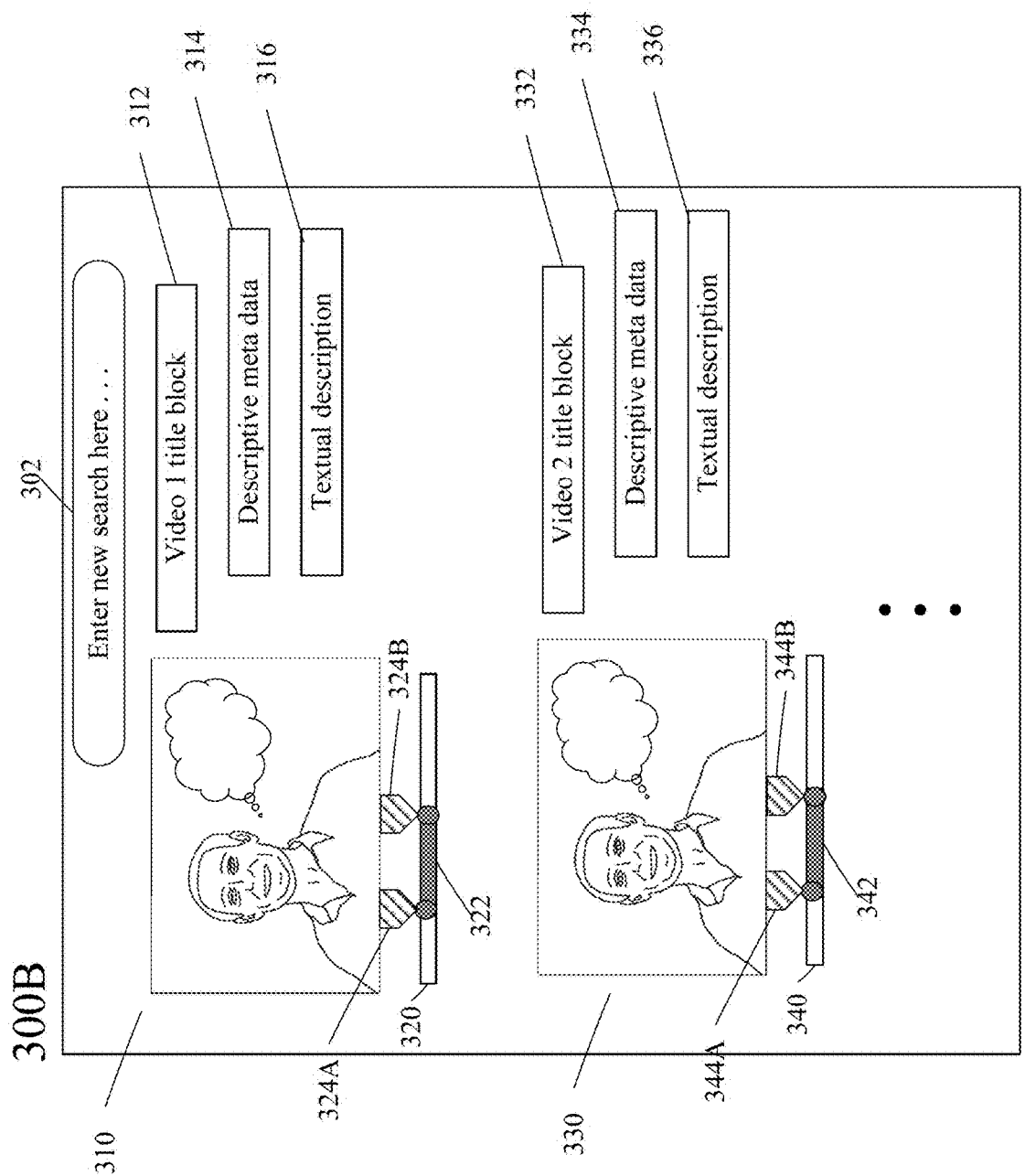
FIG. 3B illustrates an example user interface (UI) to facilitate content-based searches within multiple videos, in accordance with some embodiments of the present disclosure.

FIG. 3B illustrates an example user interface (UI) 300A to facilitate content-based searches within multiple videos, in accordance with some embodiments of the present disclosure.

As shown, UI 300B can hold multiple video results (e.g., 310 and 330), showing the results after a user has entered a search query in input field 302. As was discussed previously, the video navigation tool may perform a content search, for any number of videos, and identify response ranges from within any number of searched videos, and UI 300B illustrates multiple response segments corresponding to multiple videos that a user may request to search through (e.g., by scrolling).

In embodiments, the identified response segment of a searched video may be further presented to a user via an annotation progress bar (e.g., annotation progress bar 320, 340) that may be overlayed, or placed below, or otherwise associated with a thumbnail portion (e.g. portion 310, 330) of displayed videos. Such an annotation progress bar may serve to visually identify the response portion of the video, or the portion that is most relevant to the query of a user. As described with respect to FIG. 3A, the annotation progress bars may further include start and stop markers (e.g., start markers 324A, 344A, and stop markers 324B and 344B), to help further identify the response segment associated with the video.

In embodiments, a portion adjacent may hold other descriptive information for the video. For instance, title block portions 312, 332 may hold video title information for first and second videos 310 and 330. Metadata block portions 314, 334 may hold metadata information (e.g., duration, viewer count, user likes, etc.) for first and second videos 310 and 330. Similarly, textual description portion 316, 336 may hold textually descriptive portion pertaining to the first and second videos 310 and 300. As seen, UI 300B may hold many other elements and configurations, while accomplishing a similar result of presenting the identified response segment of multiple videos corresponding to a user query. For instance, in embodiments, multiple subregions that are not shown in FIG. 3B can hold other elements, such as video comment data, authors, total views, webpage navigation tools, etc., which may be displayed in multiple regions and configurations not shown in UI 300B.

In embodiments, the UI may also present to the user interactive elements like buttons and sliders for controlling various aspects of the video conference. For instance, a user may be shown a list of command buttons (not seen in FIG. 3B) with which a list of commands (e.g. for selecting a video, showing more videos, filtering videos, ordering videos, etc.) that may be presented to the user.

Thus, in some embodiments, the UI of the system, may not be associated with a single video, and instead may be associated with the video streaming platform at large. Such may be the case at a "home page" of the video streaming platform, or any embodiments of the video streaming platform where multiple videos are displayed and searchable. In such an embodiment, an input field, and the video navigation engine incorporating embodiments described therein, can instead be used to perform a content search over multiple videos. In such a case, the video navigation engine and an input feature can be used to search over multiple videos, or a whole database of videos in the same manner as described above. Multiple SRT format subtitle and plain text files can be created and searched for the response to a user query. In such a case, instead of outputting one time range of one video associated with the user query, multiple videos, and corresponding time ranges can be identified for a user input or query, and presented to a user to select the video, video section, or any combination of such for viewing.

Figure 4:
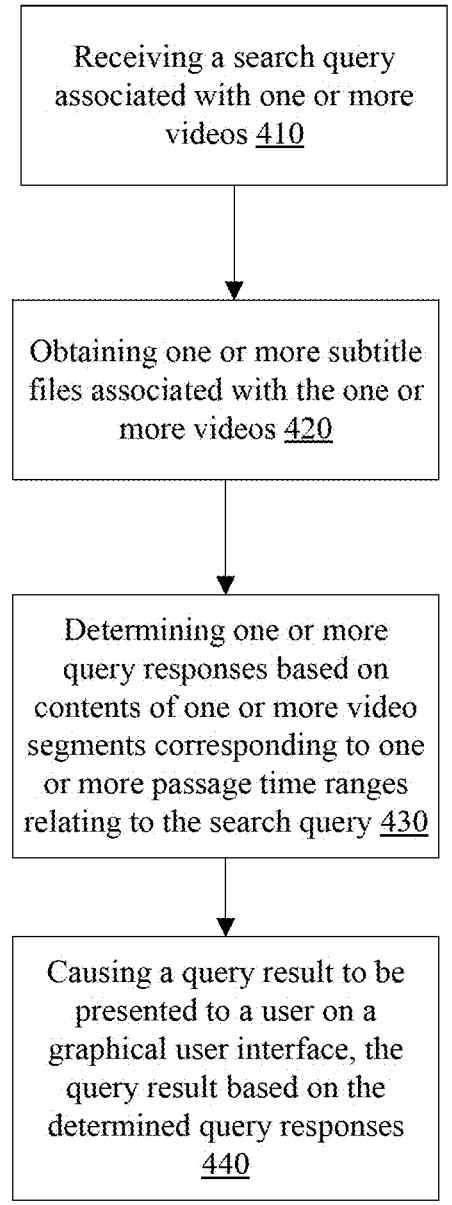
FIG. 4 is a flow diagram of an example method of supporting AI-based video content searches, in accordance with one embodiment of the present disclosure.

FIG. 4 illustrates a flow diagram of an example method supporting AI-based video content searches, in accordance with some embodiments of the present disclosure. Method 400 may be performed by processing logic that may include hardware, software, or a combination of both. The processing device may include one or more central processing units (CPUs), graphics processing units (GPUs), field-programmable gate arrays (FPGAs), application-specific integrated circuits (ASICs), or the like, or any combination thereof. In one embodiment, some or all of the operations of method 400 may be performed by a video navigation engine that may be hosted by a server or a client device. In certain embodiments, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated descriptions list the operations of method 400 in a certain order, in some embodiments, at least some of the described operations may be performed in parallel and/or in a different order. In some embodiments one or more operations of method 400 is not performed.

At block 410, method 400 may include receiving a query associated with one or more videos.

At block 420, method 400 may include obtaining subtitle files associated with the one or more videos. Each subtitle file can include a transcript having transcripts passages and video timestamps for the corresponding transcript passages. In some embodiments, obtaining the subtitle file(s) may involve processing an audio file associated with the video(s) using a set of speech-to-text conversion operations to generate the subtitle file(s), or fetching an existing one or more subtitle files from a data location. In some embodiment, the subtitle file(s) are converted into an SRT format, as discussed herein.

At block 430, method 400 may include determining, using one or more AI models, one or more query responses based on contents of one or more video segments that correspond to passage time ranges relating to the search query. Each of the passage time ranges includes a subset of corresponding video timestamps associated with a transcript passage in the subtitle files that correlates with the search query.

At block 440, method 400 may include causing presentation, on a UI, of a query result that is based on the determined query response(s).

Figure 5:
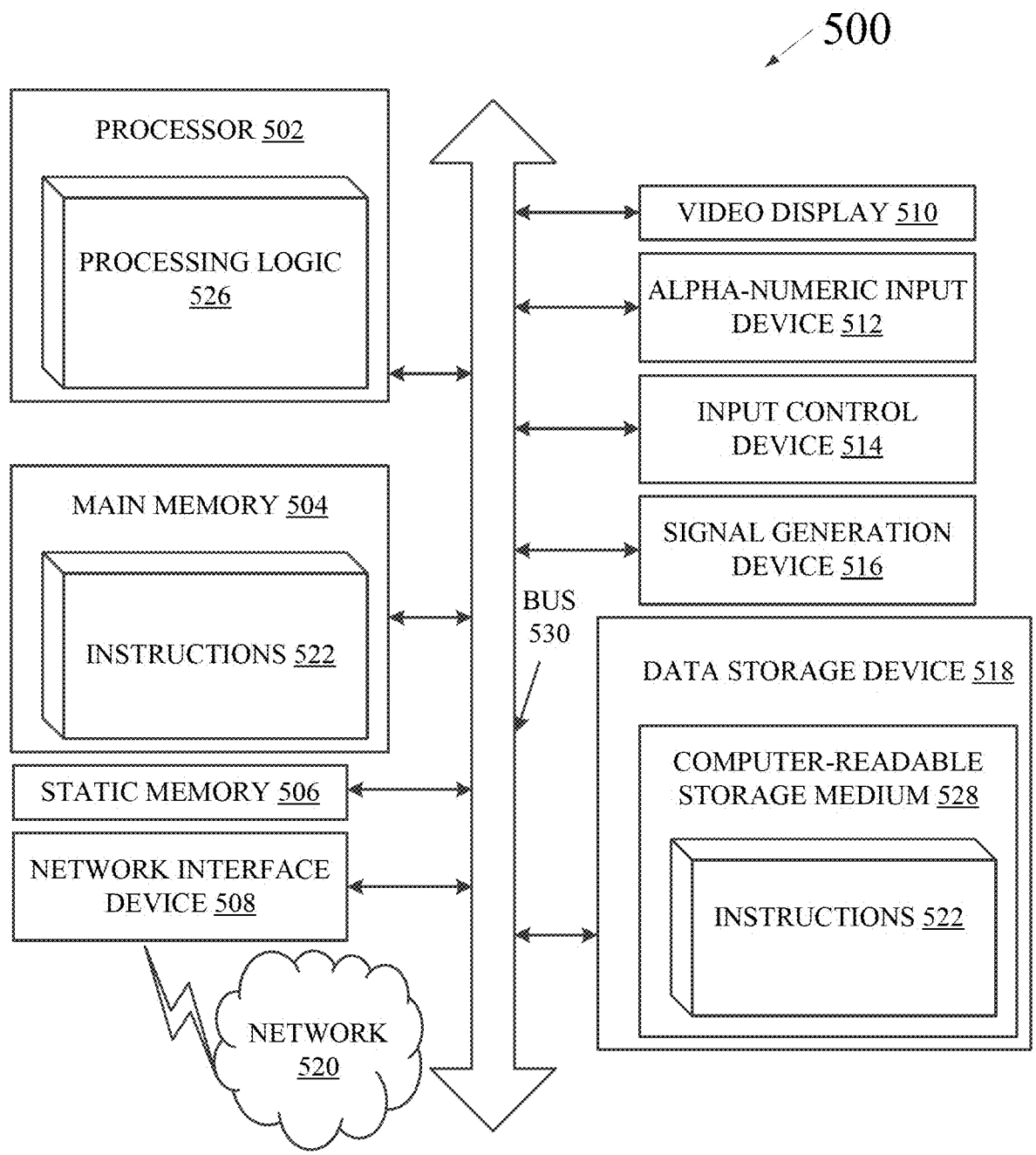
FIG. 5 depicts a block diagram of an example computer system, in accordance with one or more aspects of the present disclosure.

FIG. 5 depicts a block diagram of an example computer system 500. The computer system 500 can correspond to platform 170, server machines 140, and/or client devices 102A-N, described in FIG. 1.

FIG. 5 depicts a block diagram of an example processing device 500 operating in accordance with one or more aspects of the present disclosure. In one implementation, the processing device 500 may be a part of any computing device of FIG. 1, or any combination thereof.

Computer system 500 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 500 may include a processor 502 (e.g., a CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processor 502 represents one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 502 may be configured to execute instructions (e.g. processing logic 526 may implement video navigation engine 180 of FIG. 1).

Computer system 500 may further comprise a network interface device 508, which may be communicatively coupled to a network 520. Computer system 500 may further comprise a video display 510 (e.g., a liquid crystal display (LCD), a touch screen, or a cathode ray tube (CRT)), an alphanumeric input device 512 (e.g., a keyboard), an input control device 514 (e.g., a cursor control device, a touchscreen control device, a mouse), and a signal generation device 516 (e.g., an acoustic speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions (e.g. implementing video navigation engine 180 of FIG. 1).

Executable instructions 522 may also reside, completely or at least partially, within main memory 504 and/or within processor 502 during execution thereof by example processing device 500, main memory 504 and processor 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware, or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first, " "second," "third," "fourth," etc. as used herein are meant as labels to distinguish among different elements and may not necessarily have an ordinal meaning according to their numerical designation.

A digital computer program, which may also be referred to or described as a program, software, a software application, an engine, a software engine, a script, or code, can be written in any form of programming language, including compiled or interpreted languages, or declarative or procedural languages, and it can be deployed in any form, including as a stand-alone program or as an engine, component, subroutine, or other unit suitable for use in a digital computing environment. The essential elements of a digital computer a central processing unit for performing or executing instructions and one or more memory devices for storing instructions and digital data. The central processing unit and the memory can be supplemented by, or incorporated in, special purpose logic circuitry or quantum simulators. Generally, a digital computer will also include, or be operatively coupled to receive digital data from or transfer digital data to, or both, one or more mass storage devices for storing digital data, e.g., magnetic, magneto-optical disks, optical disks, or systems suitable for storing information. However, a digital computer need not have such devices.

Digital computer-readable media suitable for storing digital computer program instructions and digital data include all forms of non-volatile digital memory, media, and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that may include one or more digital processing devices and memory to store executable instructions to perform the operations described in this specification.

While this specification contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system engines and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for performing a video content search, comprising:
   receiving, from a client device, a search query associated with one or more videos;
   obtaining one or more subtitle files associated with the one or more videos, wherein the one or more subtitle files each comprise a corresponding transcript having a plurality of transcript passages and video timestamps for the plurality of transcript passages;
   providing the search query and one or more transcripts of the one or more videos as input to one or more artificial intelligence (AI) models;

obtaining, as output of the one or more AI models, one or more transcript passages each comprising at least a portion that most closely correlates with the search query;

processing, using the one or more AI models, the one or more transcript passages and the one or more subtitle files to generate one or more query responses and one or more passage time ranges associated with the one or more query responses; and causing a query result to be presented to a user on a graphical user interface, the query result being based on the one or more query responses.

2. The method of claim 1, wherein the one or more videos represent one video.

3. The method of claim 1, wherein the one or more videos represent more than one video.

4. The method of claim 1, wherein obtaining the one or more subtitle files comprises at least one of processing an audio file associated with the one or more videos using a set of speech-to-text conversion operations to generate the one or more subtitle files, or fetching an existing one or more subtitle files from a data location.

5. The method of claim 1, wherein the one or more subtitle files comprise a subtitle file that has been generated based on input of at least one of a user or a community of users, or has been machine generated.

6. The method of claim 1, wherein at least one subtitle file of the one or more subtitle files is in a SubRip Text (SRT) format.

7. The method of claim 1, wherein the search query comprises at least one of a scene description of a scene within the one or more videos, a scene quality of a scene within the one or more videos, a time associated with a timestamp within the one or more videos, or a question pertaining to the contents of the one or more videos.

8. The method of claim 7, wherein the one or more query responses comprise at least one of a response defining a video segment of the one or more videos that corresponds to the scene description from the search query, a response defining a video segment of the one or more videos that comprises the scene quality from the search query, a response defining a video segment of the one or more videos that corresponds to the time in the search query, or a response including a content description of a video segment of the one or more videos that answers the question pertaining to the contents of the one or more videos.

9. The method of claim 1, wherein the one or more AI models comprise at least one large language model (LLM).

10. A system comprising:
a memory device; and
a processing device communicatively coupled to the memory device, wherein the processing device is to:
receive, from a client device, a search query associated with one or more videos;
obtain one or more subtitle files associated with the one or more videos, wherein the one or more subtitle files each comprise a corresponding transcript having a plurality of transcript passages and video timestamps for the plurality of transcript passages;
provide the search query and one or more transcripts of the one or more videos as input to one or more artificial intelligence (AI) models;
obtain, as output of the one or more AI models, one or more transcript passages each comprising at least a portion that most closely correlates with the search query;
process, using the one or more AI models, the one or more transcript passages and the one or more subtitle files to generate one or more query responses and one or more passage time ranges associated with the one or more query responses; and
cause a query result to be presented to a user on a graphical user interface, the query result being based on the one or more query responses.

11. The system of claim 10, wherein the one or more videos represent one video.

12. The system of claim 10, wherein the one or more videos represent more than one video.

13. The system of claim 10, wherein obtaining the one or more subtitle files comprises at least one of processing an audio file associated with the one or more videos using a set of speech-to text conversion operations to generate the one or more subtitle files, or fetching an existing one or more subtitle files from a data location.

14. The system of claim 10, wherein the one or more subtitle files comprise a subtitle file that has been generated based on input of at least one of a user or a community of users, or has been machine generated.

15. A non-transitory computer readable storage medium comprising instructions that, when executed by a processing device, causes the processing device to perform operations comprising:
receiving, from a client device, a search query associated with one or more videos; obtaining one or more subtitle files associated with the one or more videos, wherein the
one or more subtitle files each comprise a corresponding transcript having a plurality of transcript passages and video timestamps for the plurality of transcript passages;
providing the search query and one or more transcripts of the one or more videos as input to one or more artificial intelligence (AI) models;
obtaining, as output of the one or more AI models, one or more transcript passages each comprising at least a portion that most closely correlates with the search query;
processing, using the one or more AI models, the one or more transcript passages and the one or more subtitle files to generate one or more query responses and one or more passage time ranges associated with the one or more query responses; and
causing a query result to be presented to a user on a graphical user interface, the query result being based on the one or more query responses.

16. The non-transitory computer readable storage medium of claim 15, wherein the one or more videos represent one video.

17. The non-transitory computer readable storage medium of claim 15, wherein the one or more videos represent more than one video.

* * * * *